March 29, 1960 R. H. HARPER 2,930,703
MEAT CURING

Filed March 8, 1957 2 Sheets-Sheet 1

INVENTOR.
ROBERT H. HARPER
BY R. G. Story
ATTORNEY

Fig-3

United States Patent Office

2,930,703
Patented Mar. 29, 1960

2,930,703

MEAT CURING

Robert H. Harper, Park Forest, Ill., assignor to Swift & Company, Chicago, Ill., a corporation of Illinois Application March 8, 1957, Serial No. 644,793

31 Claims. (Cl. 99—159)

This invention relates to the curing of meats, and more particularly provides an improved process for the formation of the cured color. This application is a continuation-in-part of my prior application Serial No. 490,419, filed February 24, 1955, now abandoned.

For many generations nitrates in various forms, for example, first as wood ash and later as sodium nitrate, have been used to develop the red color which is commonly associated with cured meat. In recent years nitrites have been employed, usually with nitrates, as curing salts in the manufacture of cured meat items.

It is generally believed that the natural reducing capacity of the meat, along with the end products of the metabolism of the bacteria found in meat, bring about a production of nitric oxide in situ from the curing salts. The nitric oxide, under the normal conditions of conventional curing, reacts with the reduced unoxygenated pigments of hemoglobin, myoglobin and cytochrome (the three of which can be collectively referred to by the term heme pigments) to give the cured pigments, nitric oxide hemoglobin, nitric oxide myoglobin, and nitric oxide cytochrome. The term "cured" (or cure) as used herein refers to products (or the processes) in which these nitric oxide pigments have been produced. In conventional curing the nitric oxide is not immediately available as there is necessarily a delay in the formation of the gas in situ. Hence, curing with conventional salts is a time-consuming process, and is dependent to an extent upon the fortuitous presence of the necessary bacteria in the proper numbers.

Of the three pigments which may be involved in the curing reaction, cytochrome is relatively unimportant because compared with the other two pigments the percentage of cytochrome present is relatively small. In killing animals for the production of meat, efforts are made to drain the blood from the carcass and as far as I know, hemoglobin is found only in the blood. To the extent that the blood is drained from the carcass hemoglobin becomes less important in the coloring pigments of the carcass. With a carcass well-drained of blood the principal coloring pigment of the meat produced by the meat packer is myoglobin.

The heme pigments of the freshly slaughtered meat are principally in the reduced unoxygenated forms of hemoglobin and myoglobin, but upon standing some of these pigments, particularly those on the surface layer of the carcass as well as those of freshly ground meat, are converted to the oxygenated forms (bright red pigments known as oxyhemoglobin and oxymyoglobin). In the manufacture of sausage there is normally an intentional delay before the ground meat is emulsified with water, spices, and the curing salts. As a result of this standing, a major proportion of the pigments are converted to the oxygenated form which, upon contact with the nitrate and nitrite curing salts are completely converted to the undesirable brown met pigments of methemoglobin and metmyoglobin. Of the unoxygenated reduced heme pigments 50 percent are likewise oxidized by the conventional curing salts to the met form. The other 50 percent of the unoxygenated reduced form of the pigments are converted to the cured meat pigments of nitric oxide hemoglobin and nitric oxide myoglobin. Because of these reactions, curing of pigments with conventional curing salts is always incomplete.

The brown color in freshly prepared sausage emulsions is due to the predominance of the met pigments. For the curing to proceed the met pigments must be changed to the reduced unoxygenated forms. The reduction of the met pigments to hemoglobin and myoglobin is a slow process and requires expenditure of the natural reducing capacity of the meat which would otherwise be available for color stabilization. A further expenditure of the natural reducing agents occurs in the formation of nitric oxide in situ from the nitrate and nitrite salts. In recent years efforts have been made in sausage manufacture to restore this loss of the natural reducing capacity by the addition of ascorbic acid but this is at best only a return to the initial capacity of the meat for color stabilization and is not achieved in all instances.

In conventional curing, that is, curing by utilization of curing salts, an undercured color will result if the protein be denatured by heat too early in the process. Nitrate and nitrite salts will not cure meat denatured by cooking. It is for this reason that today in the manufacture of sausage items where good color is a requisite, it is conventional practice to have a delay of about two hours between the time that the meat is mixed with the curing salts and the time that the protein in the meat is denatured in the cooking or smoking process.

Among the objects of my invention is to provide an improved process that will accelerate the formation of the cured color in meat.

A still further object of my invention is to provide an improved process for the manufacture of a cured meat product having a cured color that is more stable to the effect of light.

Another object of my invention is to provide an improved process for the curing of meat, the practice of which will increase the production capacity of existing plants.

A still further object is to provide a process for the development of a cured color in cooked meat.

Another object is to provide a curing process which eliminates the need for the use of reducing agents to accelerate the formation of the cured color.

A further object is to provide a curing process in which, without the use of reducing agents, a color stabilization is achieved equal to, if not better than, that achieved by the prior practices in which reducing agents were employed.

A further object of my process is to provide a method for the development of a cured color in meat which results in a finished product having a brighter red color.

In conventional curing processes not all of the heme pigments of the meat are cured to a nitric oxide hemoglobin and nitric oxide myoglobin state. As mentioned in the preceding paragraph, the present process may be employed to achieve a better color by curing a substantially greater percentage of the heme pigments of the meat than is possible following the practices generally prevalent in the industry today. An interesting feature of my invention is that a completely finished sausage in which the cured color has been developed by means of the conventional practices today may be further cured by following the practices of my invention. In other words, the percentage of heme pigments which were uncured in the manufacture of a sausage according to conventional practices may actually be cured after the sausage is made.

While not one of the main purposes of my invention, an incidental advantage obtained by the following of the practices of my invention is that the bacterial content of the meat cured in accordance with my invention is substantially reduced. It has been recognized in the prior art that nitric oxide is a bactericide. Thus meat cured in accordance with my invention may be sterile or substantially sterile after contact with the nitric oxide in the curing process. Not only does the nitric oxide have a bactericidal effect on the meat, but it also kills the mold spores. No matter how extensive are the efforts to maintain sterile conditions and equipment in meat packing plants, it is substantially impossible to completely eliminate the existence of mold spores. During conventional practices these mold spores become incorporated into the sausage. Some sausage products are not heated to an extent sufficient to kill the mold spores and bacteria. This is particularly true of dry sausages and for years the existence of mold has been a difficult problem in the manufacture of dry sausage. Substantial amelioration of this problem will result through the practices of my invention since the mold spores in the product itself will be killed at the time of product manufacture and only those spores which may result from subsequent contamination will be a factor.

Sausage, of course, is manufactured from meat trimmings. At times such trimmings may accumulate at a rate exceeding that at which the plant is equipped to manufacture them into sausage. Under normal refrigeration trimmings will keep for a period of about a week. If trimmings have accumulated to an extent that they cannot be used within this period of time, they must be frozen. After freezing, those trimmings cannot be used in the manufacture of all types of sausages. Furthermore, there may be a problem with respect to the thawing of the trimmings before use. Following the practices of my invention these trimmings may be partially or completely cured before storage. Such a curing will extend their storage life substantially under normal refrigeration. Thus, an advantage of my invention is that trimmings at least partially cured in accordance with my invention may be held longer under normal refrigeration and less resort to the practice of freezing trimmings is necessary. The cured or partially cured trimmings can be used in the manufacture of sausage in accordance with conventional practices or in the same manner in which fresh meat is employed in the practice of my invention.

While historically sausage has been manufactured by the use of nitrates and nitrites, those skilled in the art have been aware of the toxicity of sodium nitrite. It appears that there is no significant problem when these curing materials are used in the low levels associated with the manufacture of sausage, but there always is the possibility of an error resulting in a toxically high level of concentration. Furthermore, it is not to my knowledge fully known whether or not there is any recognized cumulative effect resulting from the consumption of sausage. In any event, an important advantage of the invention is that there is no such problem present. The nitric oxide employed is a gas. If any amount of nitric oxide gas were introduced into the meat over and above that which would chemically react with the meat, that excess would pass off as a gas. A given amount of meat will only take up so much water. Similarly only so much water may be used in producing a meat emulsion for sausage purposes before that emulsion becomes so thin as to be completely unusable. The amount of nitric oxide that may be dissolved in these amounts of added water at normal atmospheric pressures is substantially less than the maximum amount with which the meat involved will react. Therefore the meat present when using saturated water solutions to incorporate the nitric oxide into the meat will contain amounts of nitric oxide that will completely react with the meat present, leaving no remaining unreacted nitric oxide.

These and other objects and advantages of the present invention will be readily apparent to those acquainted with the packing industry in reading the following detailed description taken in conjunction with the drawings in which.

I have found that a cured color may be developed in either fresh or cooked meat with the use of preformed, i.e. extraneous, nitric oxide. In the process of my invention the meat is contacted with preformed nitric oxide. The nitric oxide in the instance of the fresh meat is present at the time of contacting in an amount sufficient to bring about a substantial conversion of the heme pigments to the nitric oxide heme pigments and, in the case of cooked meat, an amount of nitric oxide is employed sufficient to give a substantial cured color to the heat denatured meat. The extraneous nitric oxide gas is introduced into the meat either in solution or in a free gas form. The terms "preformed" and "extraneous" are used herein to distinguish from the conventional curing processes employing nitrate and nitrite salts in the meat which may result in nitric oxide being produced in situ as a result of the metabolism of the bacteria in the meat. The term "meat" employed herein is used in the broad sense of applying to the flesh of edible animals, including, without limitation, domesticated quadrupeds, fowl and fish, except in such cases as the context clearly indicates otherwise.

I have learned that despite the extremely low solubility of nitric oxide in water, the solubility is nevertheless sufficient to effect a complete cure where 1 percent of the normal amount of added water present in a sausage emulsion is added in the form of a saturated solution of the gas. This is likely due to the much greater efficiency of the preformed nitric oxide gas in developing the cured color than the normal curing materials, nitrite and nitrate salts. I have also discovered that a gas atmosphere of nitric oxide as contrasted to a liquid solution of the gas may be used to effect a cure.

Curing with nitric oxide permits a more direct and rapid reaction to the final cured meat pigments and there is no delay in processing as necessarily occurs, for instance, in the conventional manufacture of sausage to permit the formation of nitric oxide in situ. It will be appreciated that converting the heme pigments of the meat directly to the nitric oxide form avoids the partial destruction of the normal reducing capacity of the meat which occurs with the use of conventional curing salts due to their formation of the met pigments, which met pigments must be reduced before a cure can be brought about. Hence the practice of my process leaves more of the natural reducing agents for stabilization of the cured meat pigments. These principal natural reducing agents are the products that are the result of bacterial metabolism, ascorbic acid and glutathione. These reducing agents will tend to prevent the reversal of the curing reaction or if the nitric oxide heme pigments do revert to met heme pigments they will reduce the met heme pigments to the reduced unoxygenated form which then can recombine with nitric oxide to form the cured pigments.

Nitric oxide gas has been found to be startlingly effective in producing the cured color inasmuch as exceedingly small amounts of the gas may be used. This is particularly true when introducing the nitric oxide into the meat in the form of a solution. Nitric oxide present in a water solution in the amount of 0.44 part per million of the meat has given a reasonably satisfactory cured color. This amount of nitric oxide is substantially less than the stoichiometric quantity of 1 p.p.m. It is common commercial practice in the manufacture of some sausage items to use ¼ of an ounce of sodium nitrate and ¼ of an ounce of sodium nitrite per 100 pounds of meat. In parts per million, this is equivalent to 55 parts per million of nitric oxide based on the nitrate radical, and 68 parts per million nitric oxide calculated on the basis of the nitrite radical. If the nitrate and the nitrite salts were to liberate theoretically all of the nitric oxide, the amount of nitric oxide available in parts per million would be 123. In my invention nitric oxide gas used in as little as 1.25 times the stoichiometric quantity of 1 p.p.m. has given cured colors considerably brighter than that obtainable with conventional processing using normal curing ingredients. And for that matter, it has been found that an acceptable cured color by present-day standards could be effected with approximately one-half of the stoichiometric quantity required. It is my belief that the conventional cure is always incomplete in that there are met pigments appearing in the end product which cause a dulling of the otherwise bright red color that would be obtained if the pigments were wholly converted to nitric oxide hemoglobin and nitric oxide myoglobin; that is to say, the degree of brown undercast which is always present to a greater or lesser extent in conventionally cured product is in proportion to the inefficiency of the curing reaction. In contrast, in my method of curing, substantially all of the pigments of fresh meat may be converted to the final cured pigment (nitric oxide heme). Thus, a more nearly pure red meat color results.

A cure may be effected with less than 1 percent of the nitric oxide theoretically available from the nitrate and nitrite salts of conventional curing compositions, providing precautions are taken to eliminate substantially all of the oxygen from the curing system. However, a cured color can be obtained even without practicing this precaution, but more nitric oxide is required and the optimum results as to brightness and stability of the cured color may not be obtained.

Heretofore it has not been possible to impart a cured color to cooked, denatured meat. However, with the practice of my process, denatured meat will take on a cured color which color is retained on further cooking.

Nitric oxide gas in itself is not harmful to meat. However, when nitric oxide is brought into contact with meat in the presence of air a greening of the meat may result. This greening is an undesirable characteristic from an appearance standpoint. While I do not fully understand the mechanism that results in this greening, it is associated with the reaction between the nitric oxide and the oxygen of the air. Nitric oxide reacts readily with the oxygen of the air to produce a mixture of $NO_2$ and $N_2O_4$. This reaction is not an immediate one nor does the mixture result directly from the reaction of oxygen and nitric oxide, but rather there are intermediate products produced which include the tri and pentoxides of nitrogen. In my opinion the mechanism that produces the greening is either a reaction of the heme pigment with the peroxides of nitrogen that are intermediates in the oxidation of nitric oxide or it is a reaction of the nitric and nitrous acids (which may be formed with the water present) with the heme pigment. In any event, it seems clear that there is a breakdown of the heme pigment that results in the greening. I have discovered, however, that by controlling the partial pressure of the nitric oxide that is used in relationship to the partial pressure of the air available to that nitric oxide to within a predetermined range or by controlling the time of exposure of the meat to the mixture of the two gases that greening of the meat is avoided.

I have found that even though curing with extraneous nitric oxide produces a cured product equal to or better than that produced in accordance with conventional practices utilizing nitrate and nitrite salts, insofar as color development and color stability are concerned, the color development and stability may be improved still further by the incorporation of ascorbic acid into the meat prior to curing. The ascorbic acid has two effects: (1) the reduction of any met pigments that may be present, and (2) the lowering of the occluded oxygen in the meat. As to which is the more important will vary from application to application, although in most instances it will be the action in reducing the met pigment. If the meat has been exposed to air for some time before curing, a substantial amount of met pigment may have developed. The heme pigments in met form will not react with the nitric oxide to produce a cured pigment. Therefore, in such an instance the ascorbic acid plays an important part by reducing the met pigments to the reduced form in which the pigment will react with the nitric oxide to produce a cured pigment. In other cases, as a result of a particular manner of chopping of the meat, there may be a substantial amount of occluded oxygen in the chopped meat which the ascorbic acid will eliminate so that more of the nitric oxide is available to react with the heme pigments to produce a cured meat.

I have discovered that nitrogen dioxide may be used as a curing agent in place of the nitrate and nitrite salts of the prior art. While nitrogen dioxide is not nearly as advantageous nor does it have nearly as wide an application as nitric oxide, the nitrogen dioxide exhibits very substantial improvement over the prior art. For example, from a time standpoint, where the prior art practices would usually involve a holding time of from 1 to 2 hours plus a period of low heat in the smoke house to develop the curing reaction, the curing reaction may be completed with the use of nitrogen dioxide in a matter of 3 to 15 minutes. This compares with a curing time of from an instantaneous cure to several seconds cure when using nitric oxide. The curing time with nitrogen dioxide may be speeded by the addition of ascorbic acid to the meat to speed the reduction of nitrogen dioxide to nitric oxide. In referring to the curing of my invention I use the term oxides of nitrogen as consisting of nitric oxide and nitrogen dioxide. Of course, at the temperatures at which the curing operations will be carried out the nitrogen dioxide is not pure but is a mixture of $NO_2$ and $N_2O_4$.

The following examples illustrate some of the many ways in which the preformed nitric oxide gas may be introduced to the meat. In some of the examples the color of cured product was judged by a panel of experts. A rating scale of 10 is employed. A conventional cured bologna, for example, will normally have an initial rating of 8 and on rare occasions a rating of 9 before extended exposure to light. A rating of 10 is excellent and this is rarely achieved with conventional processing. Many cured meat products sold in meat markets carry a rating of 6 and this is considered by the panel to be about the minimum acceptable rating for a cured product. Ratings less than 6 are generally considered undesirable in the following examples.

*Example I*

The work of this example was undertaken to determine whether a solution of nitric oxide in water could be used to develop the cured color of meat. Two flasks were connected in a series with a vacuum pump. A prepared aqueous solution of nitric oxide was placed in flask A. Flask A was connected by suitable tubing through a valve B to flask C. Flask C, which contained the meat to be cured, was connected in turn through a valve D to a vacuum pump E. The meat had been previously ground before placing in flask C. A vacuum was pulled on the meat in flask C, with valve B being closed and valve D being open during this operation. After evacuation of the air from flask C, valve D was closed and valve B was opened to permit a siphoning of a portion of the aqueous nitric oxide solution into the flask containing the meat. Valve B was next closed and the meat permitted to stand a minute or two in contact with the nitric oxide solution before a vacuum was again drawn on flask C by the vacuum pump. The meat was removed from flask C and a portion formed into a patty which, upon heating, had a definite cured color, thus establishing that nitric oxide dissolved in water could be used for effecting a cured meat color.

The work of the preceding paragraph of this example was repeated with known amounts of meat and aqueous nitric oxide solution. The solution was formed by bubbling nitric oxide gas through water at approximately 3° C. for five minutes, the water previously being boiled and cooled to remove the air. 100 grams of ground beef was placed in flask C and evacuated to 28 inches of mercury for approximately two minutes. 5 ml. of the nitric oxide solution was sucked into the flask C from flask A and mixed for approximately one minute by manually shaking. After shaking, the vacuum was released and the meat removed to form a patty which, upon being cooked, had a slight cured color. In a second test 10 ml. of the nitric oxide solution was added to 100 g. of beef in an identical fashion, and the meat upon being cooked had a fair cured color. In the third instance 23 ml. of the solution was added to 100 g. of beef in a like manner except the manual shaking was only for 30 seconds. The beef of this third experiment, on cooking, proved to have a good cured color.

Example II

The work of this example was directed to determine whether a cure could be brought about through addition of an aqueous nitric oxide solution to the meat immediately after grinding and prior to chopping of the ground meat in water to form an emulsion, having in view that it would be desirable to cure the unoxygenated reduced heme pigments to the nitric oxide heme pigment before that pigment had an opportunity to combine physically with the air to give the bright red oxy heme pigment which comes about on the standing of freshly ground meat. The advantage of such a procedure is that the former pigment should cure more rapidly than the oxy pigment. It was believed that if the nitric oxide solution were to be added after both the grinding and chopping operations, it would likely be that the oxyheme pigment would be present in greater amounts than the reduced unoxygenated form.

7 lbs. of cow meat and 3 lbs. of regular pork trimmings were ground through a 1/8-inch plate and placed in a vacuum mixer and dry mixed for two minutes under a vacuum. The vacuum was then broken and 500 ml. of the nitric oxide solution poured into the mixer. The mixer was again vacuumized and the product was mixed for one minute and, subsequent to this, transferred to a pilot plant size chopper where the product was then chopped with spices and 635 ml. of water. The spices consist of 5.6 oz. of salt, 1.6 oz. of sugar, and 0.8 oz. of conventional bologna flavoring. The aqueous nitric oxide solution was prepared as described in Example I.

The emulsion was stuffed into artificial casings, placed in a smoke house, and subjected to a conventional smoking operation. The following day the product was found to have a very acceptable red color. A portion of the bologna was sliced, wrapped in cellophane, and placed under 35-foot candles of light in a commercial display case to check the color stability. The product prior to exposure was given a rating of 10 by a panel of six individuals. At the end of one hour the product had faded to 9, and at the second hour observation a rating of 8 was placed on the sliced bologna by the panel. The stability test was concluded at the end of the fourth hour at which time the product had a rating of 5. A conventionally cured bologna will normally have an initial rating of 8, and, on occasions, a rating of 9 prior to exposure, but will fade to a rating of 4 by the end of one hour's exposure under the same conditions.

Example III

In the preparation of the bologna of this example, 10 lbs. pork trimmings, 6 lbs. veal, 5 lbs. beef cheeks, and 4 lbs. beef trimmings were used. The beef and veal were chopped in pilot plant size chopper, along with 5 lbs. of ice, until the temperature of the emulsion reached 45° F. The chopped meat was transferred to a pilot plant size vacuum mixer and the pork which had been previously ground was added along with 900 ml. of nitric oxide solution. Mixing was carried on under a vacuum. The nitric oxide solution had been previously prepared by bubbling nitric oxide gas through water at 5° C. until saturated. After five minutes in the vacuum mixer, the emulsion was transferred to the chopper and chopped to a temperature of 70° F. The conventional bologna spices were added during the initial chopping operation.

The product was next stuffed and, following this, subjected to a smoking operation in a plant scale smoke house wherein it was held for four hours until the internal temperature reached approximately 152° F. The bologna product of this example had a bright cured color which was more stable than that of a control of the same formula which had been cured with conventional curing salts.

Example IV

The nitric oxide solution used in this example was prepared in a like manner as described in Example III, above. The meat entering into the bologna formulation of this example consists of 10 lbs. pork trimmings, 5 lbs. veal, 5 lbs. beef cheeks, and 5 lbs. beef trimmings. The beef and veal were chopped in a pilot plant size chopper with 6 lbs. of ice, along with 14 ozs. of salt, 4 oz. of sugar, and 2 oz. of conventional bologna seasoning to a temperature of 45° F. The pork was then introduced into the chopper and the comminuting continued until a temperature of 56° F. was reached, at which time a stable meat-water emulsion had been formed. The emulsion was then transferred to a vacuum mixer and a vacuum drawn to 28" mercury. Mixing was carried on for two minutes at which time 900 ml. of nitric oxide solution was introduced without breaking the vacuum, and the mixing continued under vacuum for an additional three minutes. The product from the vacuum mixer was stuffed into vinyl casings and smoked as described in Example III. The product from the smoking operation had an excellent color, both internal and external. Some of the bologna was sliced and color studies made, with a portion of the slices being placed in vacuum packages made of gas-impermeable film and others in cellophane. A conventionally cured sample of bologna of the same formula but cured with nitrate and nitrite salts was used as a comparison in the color studies. The same display case and candle power as used in Example II was employed with observations being made at 1½, 2½, 3½, and 4½ hours. At the end of 1½ hours the vacuum-packaged nitric oxide cured sample had a rating of 9, the cellophane-packaged nitric oxide sample, a rating of 6, and the conventional cured sample which was packaged in cellophane, a rating of 4½. At the second observation period, the respective samples had ratings of 8, 5½, and 4, and at the end of 3½ hours the samples were rated 8, 5½ and 3, respectively. At the last observation made after 4½ hours, the conventional cured sample was completely off color, the vacuum-packaged nitric oxide sample had a color rating of 8, and the cellophane-packaged sample a rating of 5½.

In Examples III and IV the meat emulsion out of the vacuum mixer had a light pink cast. In Example III where the meat was subjected to a second chopping operation following the vacuum mixing, the meat emulsion after removal from the chopper had a gray appearance with a pink undertone. In each of the two examples, patties of the meat made from the emulsion coming out of the vacuum mixer were cooked and in each instance on cooking, the meat had the red color commonly associated with cured meat. Also, in each example samples of the finished product following the smoking operation were eaten and found palatable.

Example V

In this example the meat was made up of 87.5 lbs. veal, 50 lbs. beef cheeks, 112.5 lbs. beef, and 125 lbs. neck fat. The beef and veal, along with the combined spices exclusive of curing salts, were chopped in a plant size chopper to a temperature of 46° F., at which temperature the pork was added and the chopping continued until the temperature of 57° F. was reached. 80 lbs. of ice was added during the chopping operation. The emulsion was removed from the chopper and 50 lbs. of it separated for special handling from the rest. The remainder of the emulsion was placed in a commercial size vacuum mixer. 1.6 oz. of curing salts (nitrates and nitrites) were added to the emulsion in the mixer and the emulsion mixed for seven minutes under a vacuum of 28" Hg. Following vacuum mixing, the product was then stuffed.

The 50-pound portion of the emulsion mentioned above was subdivided into a 20-pound and a 30-pound batch. Each of these batches had an amount of seasoning, salt, and sugar proportional to that of the control added during a vacuum mixing. During this latter operation an aqueous nitric oxide solution was introduced. In the instance of the 20-pound batch, 400 ml. of the solution was added, and in the other batch, 800 ml. The solution had been previously formed by bubbling nitric oxide gas through water held at a temperature of 5° C. until saturated. The two batches were then stuffed and placed in the same smoke house along with the control of the conventionally cured product, and heat-treated to an internal temperature of 152° F.

A color stability test of the type described in Example II was performed on the three test lots under the same light intensity. Observations were made at the end of 2, 4, 6, 7, and 11 hours. The two test lots cured with nitric oxide solution had a rating at all times of 9, with the exception that at the observation made after two hours the 800 ml.-treated product was given a rating of 9+. In the case of the product treated with conventional curing salts, at the end of two hours the rating was 7+, at the fourth hour 6, at the sixth, seventh, and eleventh hours the rating in each instance was 5.

In the present example the amount of nitric oxide calculated on the weight of the meat in the case of the sample treated with 800 ml. of saturated nitric oxide solution is 5.8 parts per million, and in the instance of the sample treated with 400 ml. of aqueous nitric oxide solution the amount of nitric oxide is 4.4 parts per million.

Example VI

In the manufacture of the bologna of this example, 75 lbs. beef, 50 lbs. beef cheeks, and 87½ lbs. veal, with conventional spicing, were chopped along with 88 lbs. of ice in a plant size chopper to a temperature of 46° F. at which temperature 162½ lbs. of regular pork trimmings were introduced. The chopping was continued until a temperature of 56° F. was reached.

A 50-pound sample of the emulsion was divided out. The remainder was transferred to a plant size vacuum mixer and held under a vacuum for seven minutes, the emulsion being agitated during the first three minutes and the last two minutes. At the time of transfer of the emulsion to the vacuum mixer, 0.8 oz. of sodium nitrate and 0.8 oz. of sodium nitrite dissolved in 12 lbs. of water were added. Following the operation in the vacuum mixer, the emulsion was stuffed and then smoked.

The 50-pound sample was subdivided into two equal portions. 500 ml. of saturated aqueous nitric oxide solution was used in curing portion 1, and 100 ml. in the instance of portion 2. Each of the portions in turn was placed in a pilot size vacuum mixer and subjected to seven minutes of vacuumizing with the mixer in operation the first three and the last two minutes of the vacuumizing period. The respective nitric oxide solutions were introduced without opening of the vacuum mixer at the end of the first three minutes. The emulsion of both portions when removed from the vacuum mixer had the pink color of cured meat. The two portions were stuffed and smoked along with the conventionally cured product.

Two days later representative samples were sliced from the three test lots and vacuum packed in a flexible gas-impermeable film. On the following day the packaged products were studied for color stability in the manner previously described by placement under 35-foot candles in a commercial display case. The test sample containing the conventional curing salts faded more rapidly than the nitric oxide treated samples. The color of the meat of portion 1 was somewhat more stable than that of portion 2.

Example VII

The bologna emulsion of this example contained 100 lbs. beef, 87½ lbs. veal, 50 lbs. beef cheeks, and 137½ lbs. pork neck fat. In this instance all the water was added in the form of ice.

The beef constituents were chopped for ten minutes in a plant size chopper along with 92 lbs. of ice and conventional spicing. The pork fat was added and the chopping carried on for another 2½ minutes to a temperature of 50° F. by which time an emulsion had been achieved. A 50-pound sample was removed and subdivided into two equal portions A and B.

A third test lot, portion C, was prepared from the remainder of the emulsion. Portion C was introduced to a plant size vacuum mixer, along with 7 lbs. of an aqueous solution of conventional curing salts (0.8 oz. sodium nitrate and 0.8 oz. sodium nitrite). After the drawing of a vacuum for three minutes without agitation, vacuum mixing was carried on for one minute. Mixing was discontinued and the emulsion held for three minutes longer under vacuum before removing it from the mixer. The vacuum employed was approximately 26" Hg.

The pilot plant vacuum mixer which was used for vacuumizing and mixing portions A and B was precooled with ice before introduction of the emulsion in each instance.

In the case of portion A the meat emulsion was vacuumized for three-quarters of a minute without agitation and then the mixer was turned on and the vacuumization continued for another three-quarter minute interval, at which time 225 ml. nitric oxide solution was added without breaking the vacuum, and the mixing continued for one minute more. The mixer was then turned off but the vacuum was maintained for two additional minutes.

Portion B emulsion was placed in the mixer and vacuumized for one minute without agitation. At the end of this interval the mixer was turned on and vacuumization and agitation was had for one minute prior to the introduction of 225 ml. of the nitric oxide solution. Mixing was continued for three additional minutes under vacuum, at which time the emulsion was removed.

The nitric oxide solution used in this example had been formed by saturating water of 5° C. The vacuum employed in the processing of portions A and B was on the order of 28" Hg.

Portions A and B and the test lot cured with conventional curing salts (portion C) were stuffed and smoked as before to an internal temperature of approximately 152° F. A fourth lot of bologna of the same formula wherein conventional curing salts were added during chopping rather than in the vacuum mixer was smoked along with the test products.

Representative slices of the four lots were vacuum packaged in flexible gas impermeable film. Four days after processing, the several packaged samples were subjected to the previously described color stability tests by exposure to 35-foot candles of light. At the end of two hours' exposure, the fourth lot was given a color rating of 5 by a panel of four members. Portion C (wherein the curing salts were added in the vacuum mixer) was given a rating of 6, portion A a rating of 8, and portion B a rating of 7. At the end of the third hour the fourth lot had faded to a value of 4, which rating was held through the seventh hour of observation. Portion C had a rating of 6 at the end of the third hour, fading to 5 at the fifth hour and to a rating of 4 at the time of the seventh hour of observation. Portion A had a rating of 7+ at the end of the third hour, which rating was held through the seventh hour. The packaged product containing slices of portion B was given a rating of 6+ at the end of the third hour, which color rating was held through the fifth hour. At the end of seven hours' observation the latter product carried a rating of 5−.

*Example VIII*

The work of this example was undertaken for the purpose of determining whether a ham could be cured through use of a pickling solution saturated with nitric oxide gas.

A pickling solution of 70° Salometer value containing salt and sugar and no curing salts was saturated with nitric oxide gas at room temperature. The pickling solution was saturated at room temperature in order to assure that the higher oxides of nitrogen would evolve from the solution. The solution was then placed in an ice bath and the temperature lowered to 10° C. At this lower temperature nitric oxide gas was bubbled through the pickling solution to increase the concentration of the gas therein.

Two hams were pumped to 110 percent of their initial weights with the saturated pickling solution. One of the hams was placed in a conventional cover pickle containing nitrate and nitrite curing salts, and the other in a similar pickle wherein no curing component was added. The hams were held in a curing cellar for 10 days, removed, and further processed in a smoke house for 40 hours. The internal temperature of the hams never exceeded approximately 152° F.

The cured colors of the hams were comparable, indicating that ham could be cured with nitric oxide alone.

*Example IX*

In the instant example the hams were checked periodically for development of color by cutting half-inch slices at frequent intervals from a first ham pumped with a nitric oxide solution and a control which had been pumped with a curing pickle containing nitrates and nitrites. The two hams were pumped to 110 percent of their initial weights with the respective curing solutions, and held under refrigeration without cover pickle. The nitric oxide pickling solution was formed in a manner like that described in the preceding example.

Slices were cut from the two hams just below the aitch bone. To determine whether the color was that of fresh or cured meat, the slices were placed into boiling water and cooked.

The relative rates of development of cured color are shown in the following table:

| Time from Pumping (Minutes) | Degree of Cure Development | |
| --- | --- | --- |
| | Nitric Oxide Cure | Nitrate-Nitrite Cure |
| 13 | 6 | 2 |
| 30 | 8 | 4 |
| 45 | 8 | 4 |
| 60 | 10 | 4 |
| 75 | 10 | 6 |
| 180 | 10 | 8 |
| 420 | 10 | 9 |

The above color ratings were arrived at by averaging the evaluations of a panel of five members. A rating of 6 is an acceptable cured color while an evaluation of 4 indicates that the development of the cured color had commenced. The color of the rating 4 could be described as a dull gray with a slight pink undercast. A rating of 10 is as near a wholly complete cured color as can be judged visually. A rating of 10 is seldom given by a panel of experts acquainted with cured meats. It will be noted that within 13 minutes from the time of pumping the nitric oxide pickling solution had effected a satisfactory cure, while the conventional nitrate-nitrite cure required 75 minutes from the time of pumping to give a comparable color to the meat.

The muscle of the cushion-side of the ham which is frequently undercured was in the instance of the gas-cured ham of a color comparable to the rest of the lean meat, and the meat adjoining the fat of the nitric oxide cured ham also appeared to have a more fully developed color than normally obtained.

It is apparent, therefore, that nitric oxide could be used to accelerate the rate of cured color development and to effect a more complete cure of muscles frequently undercured.

*Example X*

The work of this example was undertaken to demonstrate that the meat could be cured by grinding into an atmosphere of nitric oxide gas. A flexible gas-impermeable bag of vinyl plastic was attached to the outlet of a grinder. Nitrogen and nitric oxide gas were introduced into the bag in the approximate ratio of 10 parts of nitrogen to one part of the nitric oxide. Prior to the tying of the bag to the outlet of the grinder, a small amount of beef was ground through the grinder to fill its bore. A small amount of beef was ground into the gas atmosphere and removed immediately for cooking to determine whether the redness was that of cured or fresh meat. Upon frying a patty it was established that the meat had been thoroughly cured as evidenced by the redness of the cooked sample. The red color of fresh meat would have disappeared on the application of heat.

*Example XI*

This example, like the preceding, was concerned with the grinding of meat in an atmosphere of nitrogen and nitric oxide. The atmosphere consists of nitrogen and nitric oxide in the approximate proportions of 10 parts of nitrogen to one part of nitric oxide. Lean pork, with conventional spices for Genoa sausage, was ground into the atmosphere and the mixture stuffed into several casings.

In the conventional manufacture of dry sausage, of which Genoa is one, the product after stuffing is held four or five days in an area known as the green room under controlled conditions of temperature and humidity principally for the purpose of developing color. Following the green room, the product may be smoked and then transferred to a dry room, or it may be transferred directly to the dry room from the green room without smoking. The smoked-type sausage remains in the dry room 45 to 55 days, and the unsmoked sausage will normally be held three or four months.

In the present experiment the color of the product out of the grinding operation was fully comparable to that normally obtained after a five-day period in the green room, and hence it was possible in the manufacture of the Genoa sausage of this example to by-pass the green room. It will be appreciated that this advantage will, in effect, increase plant capacity and represents a monetary gain to the packer. If the product from the stuffing stage were immediately smoked in conventional processing without holding for initial development of the color in the green room, the product from the smoke house would have a dark color as there would be a denaturing of the protein before it could combine with the nitric oxide produced in situ from the curing salts. The Genoa sausage of this example was fully comparable in all ways with that obtained with conventional processing.

*Example XII*

This experiment was undertaken to demonstrate the utility of mixing an emulsion under an atmosphere containing nitric oxide gas.

60 lbs. cow meat, 25 lbs. beef, 37 lbs. veal were chopped with 50 lbs. of ice and conventional bologna spices in a chopper to a temperature of 46° F. At that temperature 78 lbs. of pork neck fat was added and the chopping continued until 56° F. was reached. Five samples of 25 lbs. each were taken at this point. Each sample of the emulsion, in turn, was placed in a pilot size vacuum mixer and subjected to two minutes of mixing under a vacuum of 28 inches of mercury. The vacuum valve was then closed and mixing continued for another minute during which nitric oxide gas was introduced to various predetermined subatmospheric pressures, with nitrogen being added to bring the internal pressure of the mixer to atmospheric. Following the one-minute mixing interval (during which nitric oxide and nitrogen had been introduced), the vacuum valve was reopened and the mixer was vacuumized for another minute to remove the nitric oxide-nitrogen atmosphere. This, of course, separated the product from the remaining (uncombined) nitric oxide. The same separation could be effected by removal of the product from the mixer. In such an instance suitable precautions to protect personnel from the oxides of nitrogen present should be taken. The product of each sample was then hand-stuffed into casings for smoking and held in the smoke house for a period of two hours at 124° F., and then the temperature was gradually elevated in increments to 170° F. over a period of six hours. The internal temperature of the product after smoking was between 152° and 156° F.

In sample 1, after first vacuumizing to a subatmospheric pressure of 28" Hg, a trace of nitric oxide was admitted to the mixer to give a subatmospheric pressure of approximately 27" Hg. Nitrogen was backfilled to atmospheric pressure. In the case of the second sample (initial vacuum of 28" Hg), the vacuum was reduced to 26" Hg with nitric oxide, and to zero with nitrogen. In samples 3, 4, and 5 (again an initial vacuum of 28" Hg) the vacuum was backfilled with nitric oxide gas to 23" Hg, 18" Hg, and 12" Hg, respectively, and, as in samples 1 and 2, nitrogen was employed to backfill to atmospheric pressure. The five samples were stuffed and smoked as described above. Sample 1 appeared to be somewhat undercured, although most of the meat had an acceptable pink color. The color of sample 2 was excellent throughout, and the same was true of samples 3 and 4. In the instance of sample 5, the color was excellent although there were some few spots that had a greenish tint, indicating that there had been some breaking down of the protein.

*Example XIII*

The work of this example was undertaken to determine the utility of using ice containing nitric oxide in the curing of meat. The ice was prepared in the following manner:

1200 ml. of water was poured into a household-type pressure cooker, the air evacuated, and the atmosphere of the cooker placed under 5 lbs. pressure of nitric oxide gas. The pressure was maintained during freezing which was accomplished by setting the pressure cooker in an acetone-Dry Ice bath. Freezing occurred rapidly and with no apparent difficulty. Five samples of beef were mixed with varying amounts of the ice until the ice had completely melted. The following table sets forth the mixtures employed and the results obtained after allowing the samples to stand 10 to 15 minutes after melting of the ice, before frying:

| Sample | Beef, grams | Ice, grams | Grams ice per 100 grams beef | Color on Cooking |
| --- | --- | --- | --- | --- |
| 1 | 500 | 120 | 24 | Good cured color. |
| 2 | 500 | 60 | 12 | Do. |
| 3 | 200 | 26 | 13 | Fair cured color. |
| 4 | 100 | 10 | 10 | Very good cured color. |
| 5 | 100 | 5 | 5 | Do. |

*Example XIV*

In Example XI above it was demonstrated that meat ground in nitric oxide atmosphere could be used in the manufacture of dry sausage. The work of the present example was undertaken to determine whether meat cured with preformed gas during the grinding stage could be used in the manufacture of domestic sausage. A domestic sausage, distinguished from a dry sausage, contains considerable added water. It will be noted in the manufacture of the dry sausage of Example XI that no water was added.

The formula of meat used in the present example was 10 lbs. regular pork trimmings, 8⅓ lbs. beef, 6⅔ lbs. veal to which was added conventional bologna seasoning, and 6¼ lbs. ice during the chopping.

As in Example XI the exhaust of the grinder was covered with a plastic bag equipped with an inlet tube for the introduction of gas. The bag was tied tightly around the grinder the bore of which had been previously filled with meat to forestall escape of the nitric oxide gas and to prevent entry of the air. Each of the several meats of the formula was individually ground through a one-quarter inch plate into a gas atmosphere made up of 10 percent nitric oxide and 90 percent nitrogen. The beef and veal were transferred to a chopper and comminuted with the ice and seasonings to a temperature of 46° F., at which temperature the pork trimmings were added and the chopping continued to a temperature of 56° F. The emulsion was stuffed and processed in a smoke house for four hours. Slices were taken from the smoked products and packaged in the flexible gas impermeable film. The product was examined by an experienced panel and subjected to a severe color stability test by exposing the product immediately after packaging to 35-foot candles of light. In the normal testing of packaged cured meats the product is held under refrigeration in a dark room for a period of time after packaging during which the meat will use up the oxygen of the air trapped under the flexible film. Since the product is in the dark, the oxygen does not have an effect upon color pigments themselves. In the instant test, however, as mentioned above, the product, immediately after packaging, was placed under the light, thus permitting the oxygen of the air to participate in the breakdown of the color pigments. Nevertheless, the product which had an initial rating of 10 was found to be quite stable, fading only to a rating of 8 in four hours. A product cured with conventional curing salts under this severe test could be expected to fade to a color rating of 4 within the same period of time.

*Example XV*

In the work of this example beef was ground as for hamburger and treated with milk saturated with nitric oxide gas. The milk-gas solution was prepared by slowly heating the milk to a temperature somewhat above room temperature to remove the oxygen entrapped therein, at which temperature nitric oxide gas was bubbled through the milk while the temperature was slowly dropped to approximately 10° C. Significantly there was no curdling of the milk, thus indicating that there had been no substantial conversion of the nitric oxide to acid. The milk solution was mixed with the ground beef to form a patty, and then cooked to determine whether the pigments were those of fresh or cured meat. The patty was observed by a panel of five men who were experienced in such observations, and was judged to have been thoroughly cured.

*Example XVI*

In this example the nitric oxide was introduced in ice to the meat undergoing the cure. The nitric oxide ice was prepared as described in Example XIII.

The meat formula consisted of 10 lbs. regular pork trimmings, 6 lbs. veal, 4 lbs. beef cheeks, and 5 lbs. beef trimmings. Conventional bologna seasoning was used.

The emulsion was prepared by chopping the beef and the veal, along with 1¼ lbs. of nitric oxide ice and 5 lbs. of regular ice in a pilot plant size chopper to a temperature of 46° F. At this point the pork was added and the chopping continued to a temperature of 56° F.

A control was prepared in a like manner, except conventional curing salts and the 6¼ lbs. of ice containing no nitric oxide were used. The curing composition consisted of 0.12 oz. of sodium nitrate and 0.12 oz. of sodium nitrite.

Both emulsions were stuffed into vinyl casings and smoked in the conventional manner to an internal temperature of 155° F. After refrigeration for four days the bologna was sliced, vacuum-packaged, and later exposed to 35-foot candles of light in a commercial display case. Prior to exposure to the light, the nitric oxide ice treated sample was rated at 8 and the control at 9 by a panel. The two lots were observed at 4 and 8 hours. The test product at the respective observations was rated 6 and 5 and the control evaluated 5 and 4. The results of this experiment show that meat can be cured with ice containing nitric oxide and that the color of the product so treated is more stable to light than product cured with conventional curing salts.

*Example XVII*

The work of this example was planned to determine whether all of the proportion used in the preparation of a sausage emulsion could be added as a saturated solution of nitric oxide. Proportion refers to the water employed in the preparation of the sausage emulsion, whether the water be in the form of ice or liquid. In the instant example, all of the proportion was added in the liquid form.

The ingredients used were 10 lbs. regular pork trimmings, 8⅔ lbs. cow meat, 6⅓ lbs. veal, plus conventional amounts of sugar, salt, and spices. The cow meat and veal, along with the sugar, salt, and spices, were placed in a chopper and comminuted until a temperature of 46° F. was reached. At this temperature the pork trimmings were added and the chopping continued to a temperature of 56° F. No water or ice was added during the chopping operation. The meat mass was then transferred to a vacuum mixer where vacuumization was carried on for two minutes without agitation, followed by two minutes of vacuumizing and agitation, during which time 2500 ml. of a saturated nitric oxide solution (temperature of 40° F.) was added. Following this interval, the vacuumization continued without agitation for another minute. The amount of water added is equal to the total amount of ice and water conventionally used in the manufacture of a sausage emulsion.

The resultant mixture was transferred to the chopper and chopped for one minute to obtain an emulsion suitable for stuffing, as the mechanical working within the vacuum mixer was insufficient to bring about an emulsion of the meat in water.

The emulsion out of the chopper was stuffed and smoked. The final product had a satisfactory cured color, with no evidence of pigment breakdown, which indicates that up to the maximum water used in a sausage formula could be added in the form of a saturated nitric oxide solution without burning or green discoloration occurring.

*Example XVIII*

This example is concerned with the curing of a previously denatured meat with nitric oxide. It is a necessity in curing with conventional salts, nitrate and nitrite, that the curing of the meat pigments be completed before the meat is cooked because the curing reaction cannot be carried out on a practical basis when the protein is denatured.

In this instance, ground beef, in a sufficient quantity to provide six samples of 5 oz. each, was cooked in a household pressure cooker under 15 lbs. steam pressure for 30 minutes. At the end of the cooking period the pressure cooker was backfilled with nitrogen and the samples individually removed in turn for treatment as follows:

The first sample was removed while still hot and placed in a blender cup equipped with a special lid which permits operation of the blender either under vacuum or pressure. A vacuum of 28" Hg was drawn for five minutes and the cup then backfilled to a subatmospheric pressure of 18" Hg with nitric oxide. The internal pressure of the blender cup was then brought to atmospheric pressure through the introduction of nitrogen. After holding for two minutes, the cup was revacuumized and opened for examination. The sample displayed a definite cured color which was given a rating of 6 by a panel of four.

The second sample was likewise removed while still hot and had added to it ascorbic acid in the amount of 0.02 percent based on the weight of the meat and subjected to the same handling in the blender cup. The product was given a rating of 8 by the panel. The improved color over the first sample indicates that a reducing agent such as ascorbic acid will assist in the development of the color. It is thought that the ascorbic acid reduces the iron of the heme structure from the ferric to the ferrous state, thus facilitating the combining of the nitric oxide with the heme.

The panel viewed a sample of the hot beef directly from the household cooker following the 30-minute cooking and, as would be expected, there was no evidence of any cured color. A hot beef control to which ascorbic acid was added in an amount of 0.02 percent without further treatment displayed no cured color. Still another sample of the hot beef was mixed with conventional curing salts, transferred to the blender, and subjected to a steam cooking for a period of time. Again there was no development of the cured color.

The two nitric oxide cured samples retained the cured color upon further cooking. The results of this example show conclusively that meat can be cured with nitric oxide after the protein is denatured.

*Example XIX*

The work of this example relates to the curing of poultry. A dressed and eviscerated stewing hen was placed in a vacuum chamber and vacuumized at 29" Hg. The chamber was backfilled with nitrogen to 5" Hg and re-vacuumized to 29" Hg. The chamber was then backfilled to 26" Hg with nitric oxide with sufficient nitrogen being subsequently added to reduce the vacuum to 15" Hg. The nitric oxide was left in contact with the hen for a period of one minute, after which the nitric oxide was removed by evacuation to 29" Hg and the chamber backfilled with nitrogen to zero vacuum before opening. The hen was cooked by boiling in water for a period of one hour and examined. It showed the development of a typical cured color throughout, demonstrating that the heme pigments had been cured.

Example XX

The work of this example relates to the curing of fish and the like. Dressed catfish and shrimp were treated with nitric oxide by the procedure outlined in Example XIX. After treatment with nitric oxide the shrimp was boiled and the catfish was pan fried. Upon examination and comparison with untreated samples, the nitric oxide treated catfish had a definite cured color and the nitric oxide treated shrimp showed a slight development of cured pink color.

Example XXI

This example demonstrates the improvement in color of conventionally cured meats upon subsequent treatment by nitric oxide. Conventionally cured samples of sliced bologna and ham which had been vacuum packaged and stored for an appreciable period of time in the dark were used as the starting material. The use of samples having been stored for an appreciable period of time was done intentionally to insure that there would not be any differences in the normal reducing capacity of the various portions of the meat which would lead to variations in color due to this factor rather than to the treatment by nitric oxide versus no treatment. The vacuum packages of bologna were opened and the product divided into two samples, one of which was repackaged immediately and the other was treated with nitric oxide. A similar procedure was followed with the ham. In each case the sample to be treated was placed in a vacuum chamber. The chamber was vacuumized to 29" Hg and backfilled with nitric oxide to approximately 27" Hg. After the nitric oxide had been in contact with the samples for 30 seconds, they were compared with the vacuum packaged untreated samples and it was observed that the color of the nitric oxide treated samples was brightened as a result of the treatment with nitric oxide.

Example XXII

In this example beef and pork trimmings were cured and utilized in the manufacture of a finished product. The beef and pork trimmings were placed in separate batches into a vacuum chamber wherein a vacuum of 28" Hg was obtained followed by a backfill of nitric oxide of 2" with one batch and a backfill of nitric oxide of 10" on a second batch. The various batches were placed in a series of jars as were the controls which had not been treated with nitric oxide. One series of the jars were stored at 45° F. and a second series at 68° F. The samples were examined organoleptically for keeping qualities at various intervals, with the following results:

| Trimming | Nitric Oxide Treatment | Storage Temp., ° F. | Substantial Putrefaction | | Total Putrefaction, Days |
|---|---|---|---|---|---|
| | | | Percent Putrefied | Days | |
| Pork | None | 68 | 100 | 3 | 3 |
| Do | 2" NO | 68 | 100 | 4 | 4 |
| Do | 10" NO | 68 | 84 | 5 | 7 |
| Do | None | 45 | 50 | 5 | 11 |
| Do | 2" NO | 45 | 25 | 24 | 30 |
| Do | 10" NO | 45 | 25 | 30 | 39 |
| Beef | None | 68 | 100 | 3 | 3 |
| Do | 2" NO | 68 | 50 | 4 | 6 |
| Do | 10" NO | 68 | 33 | 5 | 7 |
| Do | None | 45 | 50 | 11 | 24 |
| Do | 2" NO | 45 | 50 | 30 | 39 |
| Do | 10" NO | 45 | 75 | 24 | 30 |

As shown by the foregoing data there is a substantial increase in the keeping qualities of the meat treated with nitric oxide.

Example XXIII

In this example cow meat was ground into an atmosphere of nitric oxide and removed from that atmosphere after a period of 30 seconds. The cow meat was examined bacteriologically against a control of identical meat which had not been treated with nitric oxide. The untreated sample carried a bacterial count of 10,000,000 bacteria per gram, whereas the treated sample carried a count of 400,000 bacteria per gram. Lean pork trimmings were similarly treated with the untreated portion having a bacterial count of 1,900,000 bacteria per gram, whereas the nitric oxide treated portion carried a count of 300,000 bacteria per gram. In a second experiment involving another portion of lean pork trimmings, the untreated sample had a count of 4,000,000 bacteria per gram, whereas the nitric oxide treated portion had a count of 320,000 bacteria per gram. Inasmuch as the keeping qualities of the meat will be a function of the bacterial load, this experiment demonstrates that the treatment with nitric oxide greatly reduces the bacterial load and therefore will extend the keping qualities of the meat.

Example XXIV

A bologna was made from pretreated trimmings. Ten pounds regular pork trimmings, 5 pounds cow meat, 5 pounds beef trimmings were placed in a vacuum chamber which was evacuated to 29" Hg. The chamber was backfilled with nitric oxide to 26" Hg and nitrogen gas was then added to a positive pressure of 50 pounds per sq. in., which was held for five minutes. The gases were then removed by again vacuumizing the chamber. The trimmings were placed in a comminuter together with ice and conventional bologna seasonings (except for the conventional curing salts). The trimmings were chopped for three minutes to produce an emulsion, vacuumized for five minutes in a vacuum mixer, and stuffed into normal bologna casings. The handling of the stuffed casings was the same as that followed in the manufacture of conventional bologna. Upon completion of the processing the contents of the stuffed casings were examined and found to be typical of a bologna product.

Example XXV

This example demonstrates the curing of primal cuts such as hams or bacon with nitric oxide gas. Paired bellies (a belly is the cut from which bacon is conventionally made; paired bellies are taken from the opposite sides of a single animal) were used. The two left bellies were pumped, injected, with nitric oxide gas while the two right bellies were cured in a conventional bacon curing process. All four bellies were then put in dry salt (sodium chloride) for six days and subsequently smoked. All bellies were sliced and examined. The nitric oxide treated bellies had a much better cured color than the controls conventionally cured. Samples of the nitric oxide treated product were stored under showcase lighting conditions as were samples of the conventionally treated product. The nitric oxide treated samples showed better color retention than did the conventional control samples.

In curing meat with nitric oxide gas, upon occasion the meat will develop a greenish discoloration. This color will vary from a faint greenish tint to a very strong green color. An instance of this will be found in Example VII. In some instances the light greenish color appears only in isolated spots on the product, while as the discoloration grows stronger the size of the areas of the greenish discoloration also increase. I have discovered that, ignoring time, this discoloration which is a breakdown of the heme portion of the pigments is a result of the relationship of the amount of nitric oxide present as compared to the amount of oxygen present and that there is a very definite line of demarcation between those relationships of nitric oxide to oxygen which will not produce greenish discolorations and those areas where the greenish discolorations commence to appear. If the time of exposure of the meat to the combination of nitric oxide and air is very short, the relative concentrations of the two can be ignored as long as there is sufficient nitric oxide introduced to the meat to afford a cure. Just what is the maximum time of such exposure to the combination of nitric oxide and air that can be maintained without greening I do not know, but it is well under 30 seconds.

The appearance of the green color on the meat does not represent any inedibility of the product nor any factor that would cause the meat to upset the human digestive system. On the other hand, from a practical point of view it is quite undesirable because it is an appearance completely contrary to what the meat consumer historically has come to accept. The consumer upon seeing this greenish appearance is likely to believe that something has gone wrong with the meat and even that the meat may be inedible. When meat has been held under unsanitary conditions or without sufficient refrigeration, the bacterial growth may often result in a similar greenish discoloration. When the bacteria have developed to an extent sufficient to produce this greenish discoloration, the product may often be beyond the stage where it is an acceptable food product; that is, it may produce digestive upsets. Thus, while the greenish discoloration due to the use of nitric oxide gas in curing will not result in any inedibility of the product, it becomes unacceptable to the consumer because of the consumer's association with an undesirable condition in the meat resulting from other causes and signifying a likely inedibility of the product.

Figure 3:
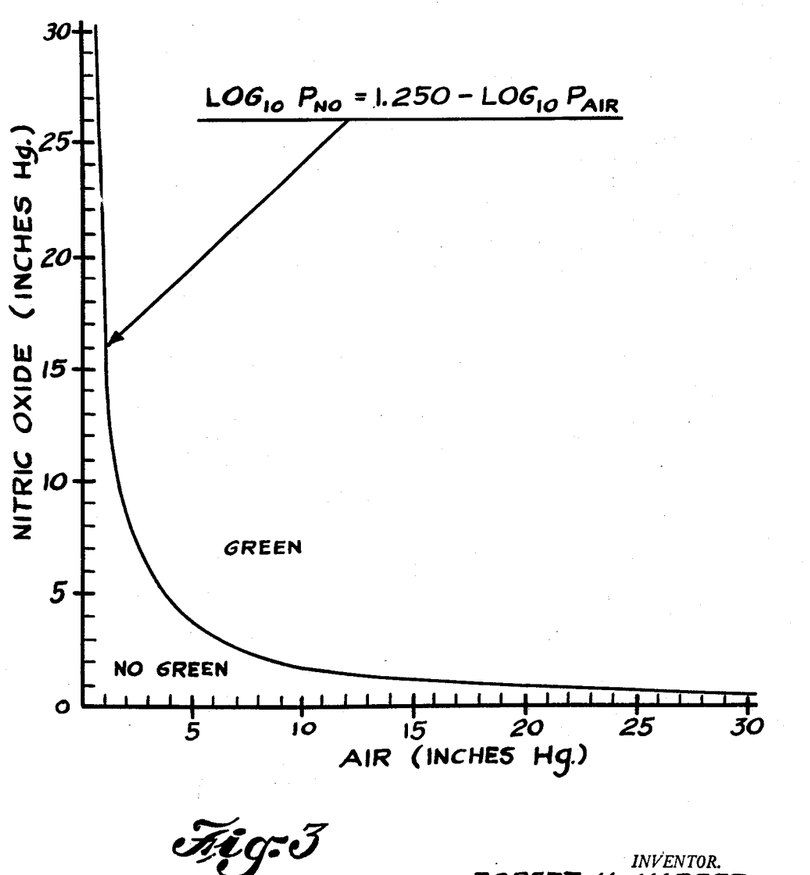
Figure 3 is a graph illustrating the relationship that must be maintained between the nitric oxide gas employed in the curing process and the oxygen that is present for reaction with that nitric oxide.

Referring to Figure 3, this figure illustrates the line of demarcation between the concentrations of nitric oxide gas in relation to the concentrations of air that will produce greening as compared to those that will not green the product, when times longer than about 30 seconds are involved. The area below the curve indicates the area within which a cure of the meat may be effected without resulting in a greening of the meat. The curve marking the demarcation between the green and no green area is described by the formula $$\log_{10} P_{NO} = 1.250 - \log_{10} P_{Air}$$

where $P_{NO}$ and $P_{Air}$ respectively refer to the partial pressure of nitric oxide and the partial pressure of air. Thus, if the sum of the logarithm to the base 10 of the partial pressure of the nitric oxide plus the logarithm to the base 10 of the partial pressure of the air present, if any, is equal to or less than 1.250, no greening will result.

Theoretically there is a portion of the area below the curve of Figure 3 that will not produce an acceptable cured product because of insufficient amounts of nitric oxide being present to effect a cure. However, this portion of the area below the curve could not be drawn for it would take a graph many times the size of Figure 3 to show where along the abscissa no cure would be effected. This is readily apparent when one considers that a line which would represent 1 part per million of nitric oxide could not be drawn on Figure 3 and be distinguishable from the abscissa of that figure, yet a cure can be obtained with this nitric oxide concentration.

From a standpoint of economics of operation one would want to balance the cost of eliminating as much air as possible with the cost of purchasing nitric oxide. Nitric oxide, while not particularly expensive in the levels required to cure meat, does cost money. The more air that is present in the system (even though one is operating below the curve of Figure 3), the more of the nitric oxide will be converted to nitrogen dioxide and thus less of the nitric oxide will be available for effecting a cure of the meat. While if sufficient time is taken, e.g. 3 to 15 minutes, the nitrogen dioxide will effect a cure, if one is seeking to obtain the substantially instantaneous cure which can be obtained by using nitric oxide, either one must furnish sufficient nitric oxide to the system to supply that portion which will react with the air to produce $NO_2$ and still leave a portion to react with the meat in the curing reaction or the work must be carried out under conditions such that the nitric oxide will react with the meat before the nitric oxide reacts with air. If a substantially instantaneous cure is not desired, the natural reducing capacity of the meat (or such added reducing materials that may be present) will convert the nitrogen dioxide back to nitric oxide which will then cure the meat.

As a further illustration, consider that at the point of substantially 0″ Hg of air in Figure 3, a minute quantity of nitric oxide, as little as 1–5 parts per million, will effect a substantially instantaneous cure. On the other hand, when one has moved to the right-hand side of Figure 3 to about the point of 18″ Hg of air, a substantially instantaneous cure cannot be obtained no matter how much nitric oxide is added as long as one stays below the curve which is necessary to avoid greening (about 1″ Hg of nitric oxide can be added at this point without greening). This is because the oxygen of the air present is reacting with substantially all of the nitric oxide to produce nitrogen dioxide so that there is an insufficient amount of nitric oxide remaining after the reaction with the air to effect a substantially instantaneous cure of the meat. If the system were allowed to stand for a period of time sufficient for the reducing capacity of the meat (or such additional reducing capacity as might be added) a cure would be obtained. As to points intermediate to those two just discussed, i.e. 0″ Hg air and 18″ Hg air, the presence of air will have a corresponding effect on the amount of nitric oxide that is available in the system to produce a substantially instantaneous cure.

The desirability of using the lowest possible concentrations of air must be balanced against the cost of obtaining that condition. For example, vacuum mixing equipment can be produced which will achieve about 28 or 29″ Hg of vacuum without an undue amount of precautions against leaks and the use of comparatively expensive vacuumization equipment. However, as one leaves this area and endeavors to approach closer to 0″ Hg of air, a substantial increase in cost of the vacuum chamber and vacuum pump are encountered. Fortunately an amount of vacuum of 27 or 28″ Hg eliminates a sufficient amount of air so that the amount of nitric oxide needed to effect a substantially instantaneous cure is not substantial. Furthermore, it will be noted from Figure 3 that considerable leeway is available as to the amount of nitric oxide that may be added at a concentration of air of 27 or 28″ Hg (vacuum) without entering the area where greening of the meat will occur. Normally one would not want to operate with 29″ Hg (vacuum) or less of air and a relatively high amount of nitric oxide, i.e. the narrow area between the upper portion of the curve and the ordinate of Figure 3. There would not only be the factor of the cost of the large amount of nitric oxide that would be used as being unnecessarily expensive, but there would also be the factor that a relatively slight variation in the amount of air present might well throw one from the no green area (between the upper portion of the curve and the ordinate) across the curve into the adjacent green area (to the right of the upper end of the curve).

In using the curve to determine one's operations in the curing of meat, generally the starting point of one's considerations would be the extent of the vacuum available or the extent of the vacuum that could be obtained by purchasing equipment at a reasonable capital expenditure. For example, assuming that one had a vacuum mixer upon which a vacuum of 28″ Hg could be drawn, this would be the equivalent of 2″ Hg of air in Figure 3. Therefore, after vacuumizing that mixer (with a sausage emulsion therein) to 28″ Hg one would find that the mixer could be backfilled with nitric oxide down to less than 20″ Hg (vacuum) without getting green product. It will be seen that the 2″ Hg of air intersects the curve of Figure 3 above the point of 8″ Hg of nitric oxide. This figure of 8+″ Hg nitric oxide backfill from the original vacuum of 28″ Hg (vacuum) would bring the reading down on the vacuum gauge to something under 20″ Hg of vacuum. Obviously there would be no advantage in working as close to the curve as a backfill of 8+″ Hg of nitric oxide would provide. A much smaller amount, 1″ or 2″ of backfill of nitric oxide would be adequate for curing purposes. If 2″ Hg were chosen for the nitric oxide backfill, the original 28″ Hg of vacuum would be reduced by backfilling with nitric oxide to a reading of 26″ Hg vacuum. In the normal practice the mixer could be further backfilled to zero by the addition of some inert gas such as nitrogen to avoid air leakage problems.

While there is a very noticeable commencement of the greening as one moves upwardly across the curve from the no green area, in some instances operation at or just slightly above this curve would be possible. It is for this reason that some qualification must be put on the necessity for staying below the curve—such qualification as is represented by the use of the word "about" in the claims. Another way of stating this is that there is an area immediately adjacent the curve where some greening will occur but under the circumstances that greening is not "objectionable." For example, when operating at concentrations of nitric oxide to air which are just above the curve there will be a slight amount of greening and this greening will be spottily distributed about the product. In other words, initially a substantial portion of the product is not green and has the bright red appearance of cured meat, while only certain limited areas are green. If product cured in this manner were to be used in sausage, the product could be reground or mixed so as to mix the slightly green portions with the more plentiful bright red portions and thereby obscure the minor amount of greening in the dominant red mass of product. In other instances the greening might be so slight that it would be undetectible to the inexperienced eye. However, when one moves substantially into the green area above and to the right of the curve in Figure 3, the product develops such a green color that it would be unsuitable from a commercial point of view.

In applying the information set forth in Figure 3 it is important to remember that the amount of air (oxygen) being discussed is that air that is available for reaction with the nitric oxide at the same time as or prior to the contact of the nitric oxide with the meat. For example, one might have a tube of meat with the exterior of that tube exposed to air. If one injected nitric oxide at the center of that tube of meat it would be the occluded air within the meat with which one would be concerned insofar as the greening problem was present. The nitric oxide within the meat would carry out the curing reaction before it would have any opportunity to react with the air at the outside of the meat. As long as the proportions of occluded air with respect to the proportions of nitric oxide were well within the area below the curve of Figure 3, the fact that air was present on the outside of the meat where it would not have an opportunity to react with the nitric oxide before the meat was cured by the nitric oxide, the conditions would be such as to create no greening problem.

In considering Figure 3 it is also important to remember that the air that is referred to in that illustration is air with its normal oxygen content. This is the same sense in which the term "air" is used elsewhere in this specification and in the claims. In other words, Figure 3 does not represent air which might be depleted of all or a part of its oxygen content nor does it represent air which has been diluted by the addition of another gas, for example nitrogen, so that the percentage of oxygen present is less than the percentage of oxygen normally found in air.

For all practical purposes it is not possible to cause the greening of cooked, i.e. denatured, meat. Actually, it can be done, but the conditions that would cause it are so far above the curve in Figure 3 that an individual practicing curing would not encounter them. The same situation is also true with respect to the curing by solutions of nitric oxide in $H_2O$. If prepared under normal conditions, such a solution will not produce greening. A frozen solution of nitric oxide in $H_2O$ prepared under pressure to incorporate a much greater amount of nitric oxide in the $H_2O$ will green if allowed to stand on the meat and melt but will not cause greening when chopped into the meat as one would do in the manufacture of sausage. Thus for all practical purposes a solution of nitric oxide in $H_2O$ will not cause greening.

Figure 1:
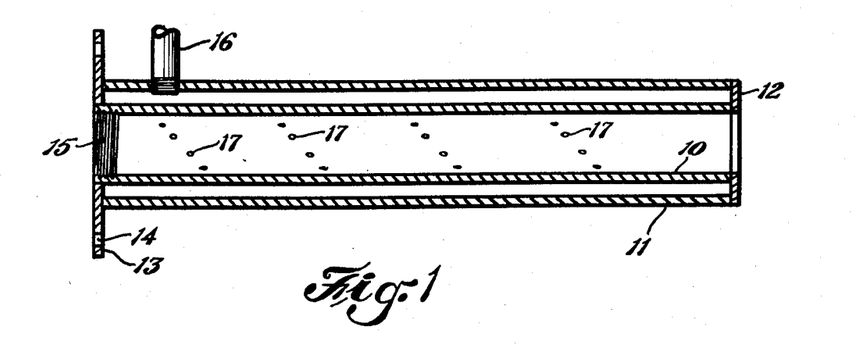
Figure 1 is a cross-sectional illustration of an attachment that might be employed on a standard meat grinder to use in curing meat.

Figure 1 is an illustration of a stuffing horn that might be employed in the present invention. The stuffing horn might be employed on a grinder or hasher such as that illustrated and described on page 38 et seq. of Sausage and Ready-To-Serve Meats, published by the Institute of Meat Packing of The University of Chicago in 1953, where the various usual ingredients of a conventional sausage to be manufactured (except, of course, for the curing salts) are put into the grinder. The grinder in that case would serve the function of mixing the ingredients as well as grinding the meat. Of course, this would not be applicable to the manufacture of sausage where an emulsion is prepared before stuffing. If a sausage was to be manufactured from an emulsion, the emulsion would be prepared in the usual manner, except for the inclusion of curing salts. The emulsion would then be put in stuffers, for example, stuffers illustrated and described in U.S. Patents Nos. 2,248,835 and 2,330,496. The stuffing horn illustrated in Figure 1 would be attached to the discharge pipe from the stuffers and the stuffers would feed the stuffing horn.

The stuffing horn of Figure 1 comprises an inner cylindrical shell 10 and an outer cylindrical shell 11. The outer shell 11 is of substantially larger diameter than that of the inner shell 10 so as to provide a space between the two shells. The two shells are mounted coaxially with a ring 12, having the same outer diameter as that of shell 11 and the same inner diameter as that of shell 10, welded to one end of each of the shells. At the opposite end of the shells is a ring 13 similarly attached. The outer diameter of ring 13 is larger than that of shell 11 so as to form a mounting flange. Ring 13 has holes 14 through which bolts may be passed in the mounting of the stuffing horn. The inner diameter of ring 13 corresponds to that of inner shell 10. A series of threads 15 are provided inside ring 13 and shell 10 at this end of the horn as an alternative means of mounting the stuffing horn.

A pipe 16 is threaded through the outer shell 11 and communicates with the space between the two shells 10 and 11. Pipe 16 is connected to a suitable source of nitric oxide gas. A plurality of holes 17 pass through the wall of inner shell 10 so as to provide passageways for the gas from the space between shells 10 and 11 to the space within shell 10. In the embodiment of Figure 1 the internal diameter of shell 10 is about one inch and the length is eleven inches.

The stuffing horn of Figure 1 is connected to the grinder or to the stuffing pumps as the case may be. The sausage material is passed through the interior of shell 10. The casing to be stuffed is slipped on outer shell 11 and allowed to move off that shell as the casing fills up in the usual manner. Nitric oxide gas is discharged through openings 17 into the sausage material. The gas diffuses into the sausage material and produces a cure as the sausage material is traversing the opening within shell 10. With this embodiment the only oxygen present (except when starting up) will be that occluded in the sausage mix. Normally this will not be sufficient to create any greening problem, inasmuch as this amount of air in relation to the nitric oxide employed would be well below the curve of Figure 3. Furthermore, the time of contact may be sufficiently short to avoid greening. Of course, in starting up the system should be flushed by running product therethrough and the inner shell 10 thereafter kept full of product so that the only amount of oxygen present will be that occluded in the sausage.

Figure 2:
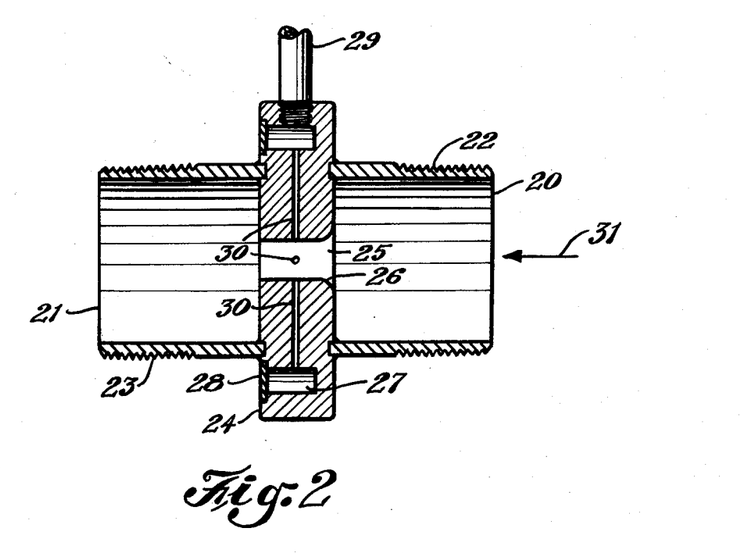
Figure 2 is a cross-sectional illustration of an injection apparatus for use in conjunction with a meat stuffer.

The embodiment of Figure 2 comprises a pair of short pieces of pipe 20 and 21 of a size to correspond to the pipe size employed in the existing stuffing apparatus. The outer ends of each of these pieces of pipe are threaded as at 22 and 23, respectively, to serve to couple the embodiment as a fitting into the stuffing system. The opposite ends of each of the pipes are welded to a cylindrical body member 24. Body member 24 has an axial passageway 25 of a cross-sectional area substantially less than that of the internal openings of pipes 20 and 21. The exact cross-sectional shape of passageway 25 is not particularly important; however I prefer a rectangular shape. The upstream corners of passageway 25 are rounded as illustrated at 26 to facilitate the entrance of the product into the passageway. It will be apparent that passageway 25 serves as an orifice within the pipe leading from the pump of the stuffing apparatus to the stuffing horn.

A cylindrical passageway 27 serving as a manifold surrounds internal passageway 25. Passageway 27 was formed by machining with a cover plate 28 being welded on the outside after machining so as to produce a closed manifold. At one side a pipe 29 is threaded into body 24 and communicates with manifold 27. Pipe 29 leads to a suitable source of nitric oxide gas. Four radial passageways 30 communicate at one end with manifold 27 and at the other end with the axial passageway 25.

The sausage mix from the stuffer to the stuffing horn passes through pipes 20 and 21 and passageway 25 in the direction indicated by arrow 31. The system is operated with pipes 20 and 21 full so as to flush out and seal out any air. Thus the only air to be contended with will be that occluded in the mix. This amount of air in relation to the nitric oxide present will bring the operation well below the curve of Figure 3. As the mix passes through passageway 25 nitric oxide gas is injected through the radial openings 30. Upon leaving passageway 25 there will be a turbulence of the mix which aids in obtaining good distribution of the nitric oxide gas through all portions of the mix.

Another use for the apparatus of Figure 1 would be in the precuring of meat to be used in the manufacture of sausage. A horn such as that disclosed in Figure 1, when attached to the end of a grinder and nitric oxide gas introduced into the meat therethrough, is used to cure meat coming from the grinder. This would be meat to which no spices, flavoring ingredients, etc., had as yet been added. That meat would then be stored until such time as it was to be incorporated into a sausage mix. Under normal refrigeration temperatures (about 40° F.) and with reasonable care in handling it would be expected that that meat would remain in satisfactory condition for a period of about 25 to 30 days, which is 3 or 4 times as long as the meat would remain in the same condition if it had not been cured. Any time during this period the meat could be mixed with the spices, flavoring ingredients, etc., and stuffed into casings. If the sausage to be manufactured was of the type produced from an emulsion, of course the step of producing the emulsion would be carried out before stuffing. Since the meat was already cured, it could be used without further curing. However, in some instances it would be desirable to pass the sausage mix made from the meat through the apparatus of Figure 1 or the apparatus of Figure 2 during the stuffing operation. In other instances the cured meat could be used in conventional sausage making operations in which nitrates and nitrites are employed.

Normally one would not use the structures of Figure 1 or 2 when curing with nitrogen dioxide rather than nitric oxide because the slowness of the nitrogen dioxide reaction would require that the material move very slowly through the disclosed apparatus or that the disclosed apparatus be made substantially longer to provide additional time for the nitrogen dioxide to be mixed in with the meat and the curing reaction to take place. However, a closed vessel, preferably having means for stirring the meat containing mix, would be quite suitable for carrying out the process employing nitrogen dioxide. In such a case the vessel would be charged with the meat containing product to be cured and the head space of the vessel flushed out with nitrogen dioxide or the air evacuated and replaced with nitrogen dioxide. Preferably the product would then be stirred to aid in enveloping the nitrogen dioxide into the product. In the product the natural reducing capacity of the meat either alone or in conjunction with an added material such as ascorbic acid would reduce the nitrogen dioxide to nitric oxide. The nitric oxide would carry out the cure as previously described with respect to the addition of nitric oxide as such. Normally speaking the curing time would be about 3 to 15 minutes. The following is a specific example illustrating the use of nitrogen dioxide.

*Example XXVI*

The work of this example relates to curing meat with nitrogen dioxide. To carry out the work of this example two vacuum chambers separated by a stop valve were connected to a vacuum line. The first vessel was used as a gas generator and the second contained a half pound portion of ground beef. A vacuum was pulled on the entire system to a reading of 28" Hg. The meat chamber was shut off from the balance of the system by closing the valve and air was backfilled into the first vessel to 15" Hg vacuum. Nitric oxide gas was then backfilled into the first vessel to a vacuum of 9" and the system closed to permit the formation of nitrogen dioxide gas according to the equation $\frac{1}{2}O_2 + NO = NO_2$. The system was permitted to stand five minutes since it is recognized that the aforementioned reaction does require a period of time for completion. After the standing period of five minutes had elapsed the stopcock was opened and at equilibration the vacuum gauge read 23" Hg. After 15 minutes of exposure of the meat to the nitrogen dioxide a sample was extracted and cooked to determine the efficiency of nitrogen dioxide in the development of a cured color. In this example no greening occurred but the meat was found to be cured. Visual observation of the meat during treatment with nitrogen dioxide showed discoloration reactions similar to those encountered when meat is cured with nitrite, namely a conversion from fresh meat red to the brown meat pigments. This is in contrast to the normal nitric oxide cure where there may be such a slight change in color as the fresh meat red is converted to the nitric oxide heme red that only one experienced with this type of cure would recognize that any change had taken place. Thus, when the sample was extracted after 15 minutes of exposure to the gas and found to be cured on cooking, it was apparent that while nitrogen dioxide can be used to cure meat the curing is undoubtedly less efficient and is somewhat more time consuming than that required for nitric oxide.

Obviously, many modifications and variations of the invention as hereinbefore set forth may be made without departing from the spirit and scope thereof, and therefore only such limitations should be imposed as are indicated in the appended claims.

I claim:

1. A process for curing meat which comprises contacting the meat with a small amount above about 0.5 part per million of extraneous oxides of nitrogen whereby to cure said meat without causing an objectionable breakdown of the heme of the meat.

2. A process in accordance with claim 1 wherein the oxide of nitrogen is nitric oxide.

3. A process in accordance with claim 1 wherein the meat is raw meat and the oxide of nitrogen is nitric oxide.

4. A process in accordance with claim 1 wherein the meat is cooked meat and the oxide of nitrogen is nitric oxide.

5. A process in accordance with claim 1 wherein the meat is partially cured meat and the oxide of nitrogen is nitric oxide.

6. The process in accordance with claim 1 wherein the oxide of nitrogen is nitrogen dioxide.

7. The process in accordance with claim 1 wherein the meat is raw meat and the oxide of nitrogen is nitrogen dioxide.

8. A process for curing meat which comprises contacting the meat with an amount of preformed nitric oxide gas effective to cure said meat under conditions such that the sum of the logarithm to the base 10 of the partial pressure of the nitric oxide plus the logarithm to the base 10 of the partial pressure of the air present, if any, is equal to or less than 1.250.

9. A process in accordance with claim 8 wherein the meat is raw meat.

10. A process in accordance with claim 8 wherein the meat is cooked meat.

11. A process in accordance with claim 8 wherein the meat is partially cured meat.

12. A process for curing meat which comprises adding to said meat an amount of a solution of nitric oxide in $H_2O$ containing more than about 0.5 part per million nitric oxide whereby to cure said meat.

13. A process in accordance with claim 12 wherein the solution is a liquid.

14. A process in accordance with claim 12 wherein the solution is a solid.

15. A process for curing meat which comprises contacting the meat with an amount above about 0.5 part per million of extraneous nitric oxide effective to cure said meat while substantially excluding air from said meat.

16. A process in accordance with claim 15 wherein the nitric oxide is a gas.

17. A process in accordance with claim 15 wherein the nitric oxide is a solution of nitric oxide in $H_2O$.

18. A process for curing meat which comprises exposing the meat to nitric oxide gas for a period of time substantially less than about 30 seconds.

19. The improvement in the manufacture of a cured sausage having ingredients including raw meat which comprises contacting at least a portion of said meat with an amount of extraneous nitric oxide above about 0.5 part per million whereby to cure said meat without causing an objectionable breakdown of the heme prior to the mixing of said portion with the remaining ingredients of the sausage.

20. The improvement in the manufacture of a cured sausage having ingredients including raw meat which comprises contacting at least a portion of said meat with an amount of extraneous nitric oxide gas to cure said meat under conditions such that the sum of the logarithm to the base 10 of the partial pressure of the nitric oxide plus the logarithm to the base 10 of the partial pressure of the air present, if any, is equal to or less than 1.250.

21. The improvement in the manufacture of a cured sausage having ingredients including raw meat which comprises contacting at least a portion of said meat with an amount of a solution of preformed nitric oxide in $H_2O$ effective to cure said meat prior to the mixing of said portion with the remaining ingredients of the sausage.

22. The improvement in the manufacture of a cured sausage having ingredients including raw meat which comprises exposing at least a portion of said meat to above about 0.5 part per million nitric oxide gas for a period of time substantially less than about 30 seconds.

23. The process of grinding meat for use in subsequent processing into cured meat containing items, said process including the step of forming a stream of ground meat, excluding ambient air from said stream for a given interval and introducing preformed nitric oxide into said stream during said interval.

24. The process of grinding meat for use in subsequent processing into cured meat containing items, said process including the step of forming a stream of ground meat, excluding ambient air from said stream for a given interval and introducing nitric oxide gas into said stream during said interval.

25. The process of grinding meat for use in subsequent processing into cured meat containing items, said process including the step of forming a stream of ground meat, excluding ambient air from said stream for a given interval and introducing a solution of preformed nitric oxide and water into said stream during said interval.

26. The improvement in the process of comminuting meats which comprises the addition to said meat at the time of comminution of a frozen solution of nitric oxide in water.

27. The improvement in the preparation of a cured sausage item which comprises preparing an emulsion of meat and water, drawing a substantial vacuum upon said emulsion, backfilling the vacuum with nitric oxide gas in an amount such that the sum of the logarithm to the base 10 of the partial pressure of the nitric oxide plus the logarithm to the base 10 of the partial pressure of any remaining air is equal to or less than 1.250, agitating the emulsion in the presence of said gas to bring about an enveloping of some of the nitric oxide into the emulsion, and separating the emulsion from the remaining nitric oxide gas.

28. The improvement in the preparation of a cured sausage item manufactured from an emulsion of meat and water which comprises adding at least part of the water used in producing said emulsion as a solution of nitric oxide in $H_2O$.

29. In the process of preparing a cured meat product wherein a meat curing preparation is pumped into a fresh meat item, the improvement which comprises including in said preparation an aqueous solution of nitric oxide in an amount effective to cure said item.

30. The process of preparing a cured meat product including the step of injecting nitric oxide gas into said product below the surface thereof.

31. A process for improving the color and stability of a cured meat product which comprises enveloping said product in preformed nitric oxide gas.

References Cited in the file of this patent

UNITED STATES PATENTS

| | | |
|---|---|---|
| 1,017,144 | Gironcoli | Feb. 13, 1912 |
| 1,538,369 | Akiyama | May 19, 1925 |
| 2,553,533 | Komarik et al. | May 15, 1951 |
| 2,623,826 | Grinstead | Dec. 30, 1952 |
| 2,681,279 | Sloan et al. | June 15, 1954 |

OTHER REFERENCES

Food Research, 1940, vol. 5, pp. 593 to 605 inclusive, article entitled The Heme Pigments of Cured Meats, by W. M. Urbain et al.